United States Patent
O'Sullivan et al.

(10) Patent No.: US 9,031,915 B2
(45) Date of Patent: May 12, 2015

(54) RELATIONSHIP MANAGEMENT FOR CONTACT STALENESS

(75) Inventors: Patrick J. O'Sullivan, Ballsbridge (IE); Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 12/252,349

(22) Filed: Oct. 15, 2008

(65) Prior Publication Data

US 2010/0094837 A1   Apr. 15, 2010

(51) Int. Cl.
G06F 17/00 (2006.01)
G06F 7/00 (2006.01)
G06Q 10/10 (2012.01)

(52) U.S. Cl.
CPC .................... *G06Q 10/107* (2013.01)

(58) Field of Classification Search
CPC .......................... G06F 17/3064; G06F 2201/86
USPC .......................................... 707/665, 667, 668
See application file for complete search history.

(56) References Cited

U.S. PATENT DOCUMENTS

| | | | |
|---|---|---|---|
| 5,793,972 A * | 8/1998 | Shane | 709/219 |
| 5,930,764 A * | 7/1999 | Melchione et al. | 705/10 |
| 6,151,567 A * | 11/2000 | Ames et al. | 703/13 |
| 6,330,598 B1 * | 12/2001 | Beckwith et al. | 709/223 |
| 6,490,597 B1 * | 12/2002 | Singh et al. | 707/999.202 |
| 6,496,907 B1 * | 12/2002 | James | 711/159 |
| 6,549,891 B1 * | 4/2003 | Rauber et al. | 705/28 |
| 6,766,442 B1 * | 7/2004 | Kahle et al. | 712/239 |
| 7,047,212 B1 * | 5/2006 | Pych et al. | 705/27.1 |
| 7,072,918 B2 * | 7/2006 | Garthwaite | 707/999.1 |
| 7,089,228 B2 * | 8/2006 | Arnold et al. | 707/999.202 |
| 7,197,502 B2 * | 3/2007 | Feinsmith | 707/999.009 |
| 7,467,126 B2 * | 12/2008 | Smith et al. | 707/999.003 |
| 7,591,417 B1 * | 9/2009 | Mathias et al. | 235/380 |
| 2002/0126814 A1 * | 9/2002 | Awada et al. | 379/142.01 |
| 2005/0021551 A1 * | 1/2005 | Silva et al. | 707/102 |
| 2005/0041793 A1 * | 2/2005 | Fulton et al. | 379/211.01 |
| 2006/0136520 A1 * | 6/2006 | Leppinen et al. | 707/204 |
| 2007/0067439 A1 * | 3/2007 | Mason et al. | 709/224 |
| 2008/0118048 A1 * | 5/2008 | Lowe | 379/218.01 |
| 2008/0215442 A1 * | 9/2008 | McGary et al. | 705/14 |
| 2009/0092239 A1 * | 4/2009 | Macwan | 379/201.01 |

* cited by examiner

*Primary Examiner* — Pavan Mamillapalli
(74) *Attorney, Agent, or Firm* — Steven M. Greenberg, Esq.; CRGO Law

(57) ABSTRACT

A contact management data processing system can be provided. The system can include a contact manager coupled to a list of contacts and stored staleness criteria stored in connection with the list of contacts. The system also can include stale contact management logic. The logic can include program code enabled to apply the stored staleness criteria to a selected contact to identify a stale contact, and to manage the stale contact in the list of contacts. In aspects of the embodiment, the list of contacts can be stored in a personal computer, in a server remotely disposed from the contact manager, in a telephone such as a cellular telephone or voice over Internet protocol (VoIP) telephone, or in a personal digital assistant to name but a few.

15 Claims, 2 Drawing Sheets

RELATIONSHIP MANAGEMENT FOR CONTACT STALENESS

BACKGROUND OF THE INVENTION

The present invention broadly relates to the field of contact management and more particularly relates to the field of contact frequency monitoring for contact management.

Contact management refers to the management of contacts in a computing environment. Contact managers originated as extensions to the computerized version of an address book or rolodex. Sales driven organizations adopted contact management systems decades ago to manage the sales cycle for products and services. Legacy contact management systems provided address book functionality along with forms driven information management for each contact in an address book such as role within an organization, family information and an indication of last communication with each contact along with a notes field for the nature of the relationship with the contact. Additionally, legacy contact management systems provided calendaring and scheduling functionality integrated through association with the different contacts in the address book.

Modern e-mail communications systems have adopted many of the features of legacy contact managers to provide a robust contact management environment supporting electronic communications. In this regard, the electronic communications associated with different contacts in a list of contacts such as an address book are now integrated fully with the address book so that electronic communications exchanges with contacts in the address book can be stored for future reference. In this way, end users can monitor the frequency with which end users communicate with contacts by manually scanning persisted records for e-mail communications with the contacts in the address book.

The explosion of e-mail users, however, has resulted in a corresponding expansion of the average address book for the end user. Managing hundreds if not thousands of contacts can become unwieldy. In that oftentimes contact information remains synchronized between the address book of an e-mail client or contact manager, and mobile computing devices like cellular telephones, storage space can be at a premium. A large number of contacts in an address book, then, can be problematic for many end users.

To address the growing size of an address book, end users occasionally engage in a manual pruning process. The manual pruning process involves the end user scanning the contacts in an address book to determine which contacts are current, and which have become stale. A stale contact is a contact with whom infrequent (if any) communications have transpired within a threshold period of time. For an address book of modest size, manually pruning stale contacts is not terribly challenging. However, for the typical corporate end user, managing stale contacts from an address book can be time consuming, unmanageable and, in consequence, seldom happens.

BRIEF SUMMARY OF THE INVENTION

In an embodiment of the invention, a stale contact management method can be provided. The method can include storing staleness criteria for contacts in a list of contacts such as those in an address book, applying the stored staleness criteria to the selected contact to identify a stale contact, and managing the stale contact in the list of contacts. In aspects of the embodiment, storing staleness criteria for contacts in a list of contacts can include storing a minimum frequency of communicative interaction with each contact over a threshold period of time, or storing a minimum quality of communicative interaction with each contact over a threshold period of time, or storing a required on-going collaborative membership in a collaborative tool with each contact over a threshold period of time. Further, in other aspects of the embodiment, managing the stale contact in the list of contacts can include removing the stale contact from the list of contacts, grouping the stale contact with other stale contacts in the list of contacts, or denoting the stale contact as stale in the list of contacts. Finally, in yet another aspect of the embodiment, the method additionally can include establishing different staleness criteria for different roles of the contacts in the list of contacts.

In another embodiment of the invention, a contact management data processing system can be provided. The system can include a contact manager coupled to a list of contacts for example those in an address book of contacts. The system also can include stale contact management logic. The logic can include program code enabled to apply stored staleness criteria to a selected contact to identify a stale contact, and to manage the stale contact in the list of contacts. In aspects of the embodiment, the list of contacts can be stored in a personal computer, in a server remotely disposed from the contact manager, in a telephone such as a cellular telephone or voice over Internet protocol (VoIP) telephone, or a personal digital assistant to name a few.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention.

DETAILED DESCRIPTION OF THE INVENTION

Figure 1:
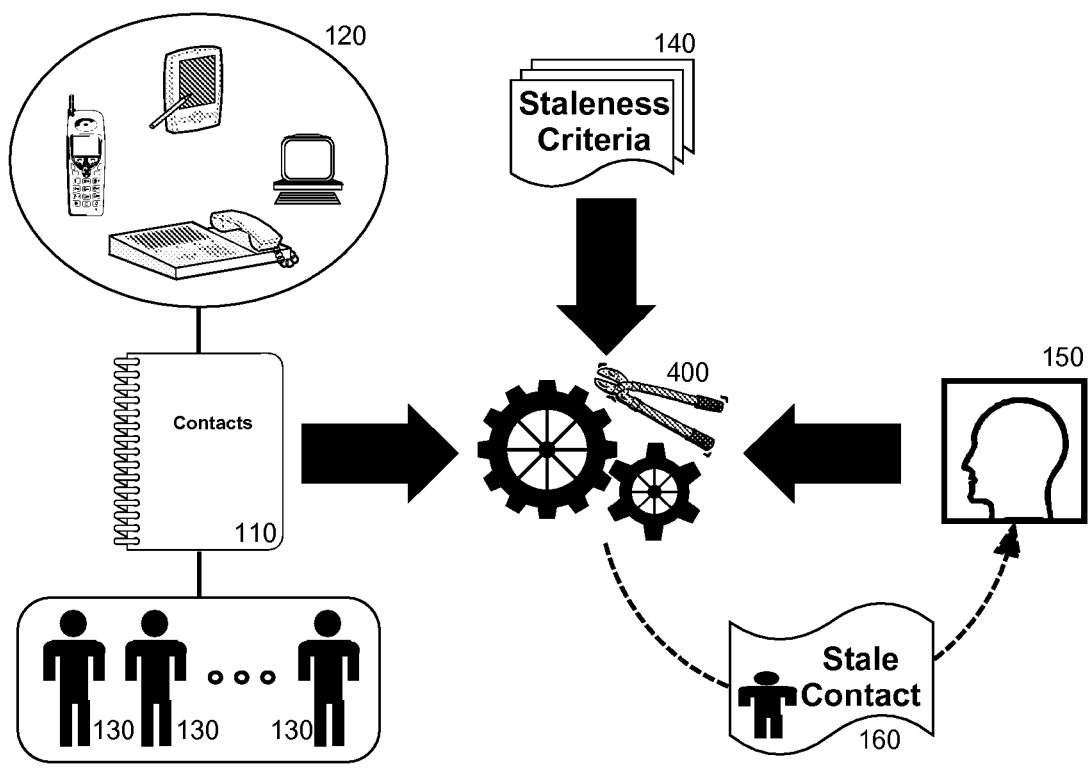
FIG. 1 is a pictorial illustration of a process for managing stale contacts in a list of contacts according to staleness criteria.

As will be appreciated by one skilled in the art, the present invention may be embodied as a method, data processing system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, for example in baseband. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In an embodiment of the invention, staleness criteria can be stored for contacts in a list of contacts for an end user. The staleness criteria can include a threshold frequency of communicative interaction between the end user and a given one of the contacts. The staleness criteria further can include a qualitative characteristic of communicative interactions between the end user and a given one of the contacts. As such, the communicative interactions can be compared to the staleness criteria at the manual direction of the end user, or on an automated basis. Contacts failing the staleness criteria can be identified as stale and can be subject to corrective action. The corrective action can include by way of example, pruning the stale contact from the list of contacts, notifying the owner of the list of contacts of the stale contact, sending a message to the stale contact in order to refresh the relationship with the stale contact. In this way, a voluminous list of contacts can be managed in a uniform way without requiring the end user to engage in a tedious and subjective manual pruning process of stale contacts.

In illustration, FIG. 1 is a pictorial illustration of a process for managing stale contacts in a list of contacts according to staleness criteria. As shown in FIG. 1, contacts 130 can be arranged in a list of contacts 110, such as an address book or personal directory within a computing system 120 such as a contact manager, e-mail client, instant messaging client, groupware collaboration client, mobile telephone, personal digital assistant and the like. Staleness criteria 140 can be established and stored for the contacts 130, for example a frequency of communication with the contacts 130 during a threshold period of time, a quality of communication with the contacts 130 during a threshold period of time for instance a duration of a conversation or length of a textual communication, or co-membership in an active collaborative tool like a team room, shared document library, or discussion forum.

Thereafter, a process for managing stale contacts in a list of contacts according to staleness criteria 400 can apply the staleness criteria 140 to one or more of the contacts 130 in order to identify a stale contact 160. The process for managing stale contacts in a list of contacts according to staleness criteria 400 can be initiated manually by an inquiring end user 150, or automatically by the computing system 120. In either circumstance, identified stale contacts 160 can be reported to the inquiring user 150 for corrective action within the list of contacts 110. In this regard, the identified stale contacts 160 can be removed from the list of contacts 110, grouped separately as "stale contacts" within the list of contacts 110, or simply denoted within the list of contacts 110 as stale contacts. Alternatively, the end user 150 can be notified of the identified stale contacts 160 and a communication at the option of the end user 150 can be initiated with any of the identified stale contacts 160 in order to refresh a communicative relationship between the end user 150 and the identified stale contacts 160.

Figure 2:
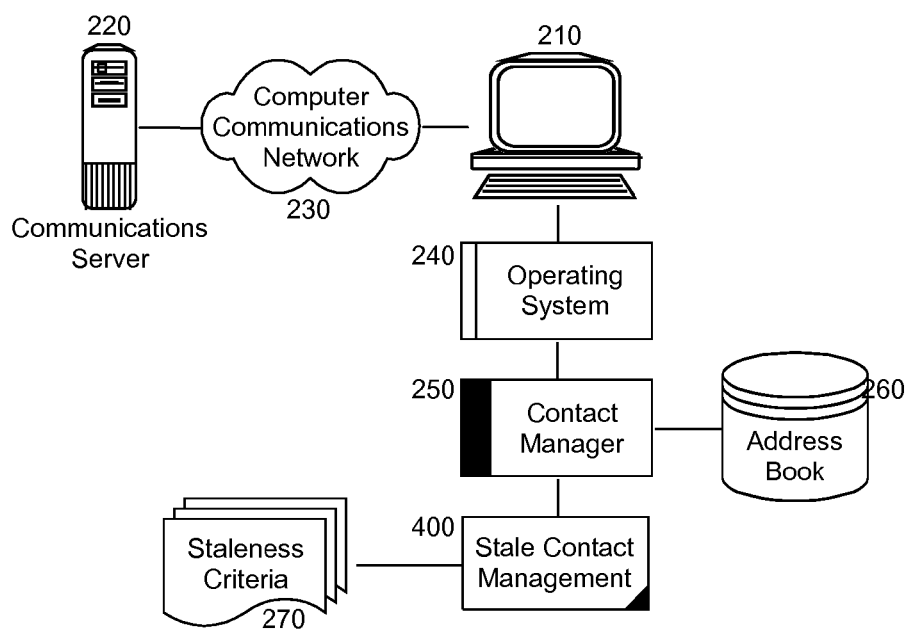
FIG. 2 is a schematic illustration of a contact management data processing system configured for managing stale contacts in a list of contacts according to staleness criteria.

The process described in connection with FIG. 1 can be implemented within a contact management data processing system. In further illustration, FIG. 2 is a schematic illustration of a contact management data processing system configured for managing stale contacts in a list of contacts according to staleness criteria. The system can include a host computing platform 210 supporting an operating system 240 managing a contact manager 250. The host computing platform 210 can include a server environment for providing access to the contact manager 250 to multiple different end users, or the host computing platform 210 can be a stand alone computing device providing access to the contact manager 250 to a single end user as would be the case were the host computing platform to be a personal computer, personal digital assistant, VoIP telecommunications device, or mobile phone.

The host computing platform 210 further can be configured for communicative coupling to a communications server 220 over computer communications network 230, for example the global Internet. The communications server 220 can include an e-mail server, instant messaging server, group collaboration server, VoIP gateway, or any combination thereof across any number of computing servers.

The contact manager 250 can provide contact management services in connection with a data store of contacts 260, referred to herein as a list of contacts. The contact manager 250 in particular, can track metrics relating to communications exchanges for each contact in the data store of contacts 260, including a frequency of communicative interactions with a given contact, a quality of communicative interactions with a given contact such as a duration of a phone call, a length of a textual message, etc. The contact manager 250 further can track metrics relating to a communicative relationship with a given contact such as co-membership in a collaborative tool such as a team space, shared document library or discussion forum, to name a few.

Stale contact management logic 400 implementing a process for managing stale contacts in a list of contacts according to staleness criteria 270 can be coupled to the contact manager 250. The stale contact management logic 400 can include program code enabled to apply the staleness criteria 270 to one or more contacts in the data store of contacts 260 in order to identify stale contacts. The program code of the stale contact management logic 400 further can be enabled manage identified stale contacts in the data store of contacts 260, either by removing stale contacts from the data store of contacts 260, grouping stale contacts within the data store of contacts 260, or merely denoting the stale contacts as stale within the data store of contacts 260 and notifying an end user of the identified stale contacts such that the end user can refresh a communicative relationship with each of the stale contacts through renewed attempts at communication.

Figures 3, 4:
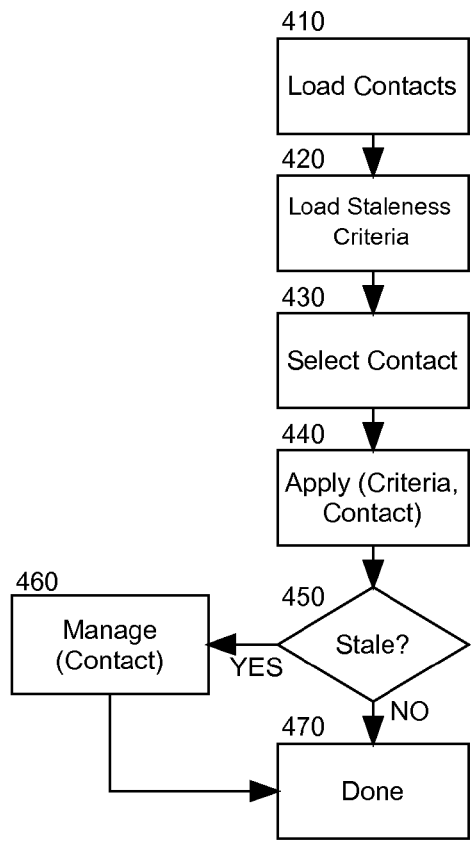
FIG. 3 is a screen shot of a dialog box arranged to configure staleness criteria for managing stale contacts in a list of contacts according to staleness criteria; and, FIG. 4 is a flow chart illustrating a process for managing stale contacts in a list of contacts according to staleness criteria.

Of note, the staleness criteria 270 can be variably established by the end user to meet the subjective criteria of staleness by the end user. In yet further illustration, FIG. 3 is a screen shot of a dialog box arranged to configure staleness criteria for managing stale contacts in a list of contacts according to staleness criteria. The exemplary user interface 300 shown in FIG. 3 demonstrates that an end user can select one or more staleness criteria to be applied to a contact in a list of contacts. For instance, the staleness criteria can relate to a frequency of communicative interaction with a contact during a determined threshold period of time. Further, the staleness criteria can relate to the relationship between the end user and the contact, such as concurrent and continuing membership in a collaborative tool such as a discussion forum, shared document library or team room such that when the membership discontinues due to the removal of the collaborative tool, staleness can result. Optionally, the staleness criteria set forth in the user interface 300 of FIG. 3 can vary according to a role of a contact such that some roles deemed more important than others receive more lenient and flexible staleness criteria.

In even yet further illustration, FIG. 4 is a flow chart illustrating a process for managing stale contacts in a list of contacts according to staleness criteria. Beginning in block 410, a group of contacts can be retrieved from a list of contacts for staleness analysis and also, in block 420 stored staleness criteria can be loaded. In block 430, a contact in the group of contacts can be selected for analysis and in block 440, the staleness criteria can be applied to the selected contact. In decision block 450, it can be determined whether or not the contact is stale based upon the application of the staleness criteria. If so, in block 460 the contact can be managed ranging from notifying the end use of the stale contact to removing the stale contact from the list of contacts. For instance, a dialog box can be provided prompting the end user to select a desired action with regard to the stale contact such as pruning, initiating a phone call, sending an e-mail, or scheduling a meeting. Finally, in block 470 the process can end.

Having thus described the invention of the present application in detail and by reference to embodiments thereof, it will be apparent that modifications and variations are possible without departing from the scope of the invention defined in the appended claims

We claim:

1. A stale contact management method comprising:
storing staleness criteria for contacts in a list of contacts, wherein the staleness criteria are adjustable by an end user;
applying the stored staleness criteria to a selected contact to identify a stale contact; and,
prompting the end user to select a desired action from a list of different desired actions with regard to the identified stale contact by displaying a dialog box to the end user and requiring the end user to select the desired action from the list of different desired action performed upon the identification of the stale contact, the list of different desired actions comprising any combination of removing the identified stale contact from the list of contacts, grouping the identified stale contact with other identified stale contacts in the list of contacts, denoting the identified stale contact as stale in the list of contacts, notifying the end user of the identified stale contact, notifying an owner of the list of contacts of the identified stale contact, initiating a phone call between the end user and the identified stale contact, and scheduling a meeting between the end user and the identified stale contact.

2. The method of claim 1, wherein storing staleness criteria for contacts in a list of contacts comprises establishing a minimum frequency of communicative interaction with each contact over a threshold period of time.

3. The method of claim 1, wherein storing staleness criteria for contacts in a list of contacts comprises establishing a minimum quality of communicative interaction with each contact over a threshold period of time.

4. The method of claim 1, wherein storing staleness criteria for contacts in a list of contacts comprises establishing a required on-going collaborative membership in a collaborative tool with each contact over a threshold period of time.

5. The method of claim 1, further comprising storing different staleness criteria for different roles of the contacts in the list of contacts.

6. A contact management data processing system comprising:
a contact manager coupled to a list of contacts; and,
stale contact management logic coupled to the contact manager, the logic comprising program code enabled to load a contact from the list of contacts, to apply stored staleness criteria to the loaded contact to identify a stale contact, and to prompt an end user to select a desired action from a list of different desired action with regard to the identified stale contact by displaying a dialog box to the end user and requiring the end user to select the desired action from the list of different desired action performed upon the identification of the stale contact, wherein the staleness criteria are adjustable by the end user and wherein the list of different desired actions comprising any combination of removing the identified stale contact from the list of contacts, grouping the identified stale contact with other identified stale contacts in the list of contacts, denoting the identified stale contact as stale in the list of contacts, notifying the end user of the identified stale contact, notifying an owner of the list of contacts of the identified stale contact, initiating a phone call between the end user and the identified stale contact, and scheduling a meeting between the end user and the identified stale contact.

7. The system of claim 6, wherein the list of contacts is stored in a personal computer.

8. The system of claim 6, wherein the list of contacts is stored in a telephone.

9. The system of claim 6, wherein the list of contacts is stored in a personal digital assistant.

10. The system of claim 6, wherein the list of contacts is stored in a server remotely disposed from the contact manager.

11. A computer program product for stale contact management, the computer program product comprising:
a computer usable storage medium having computer usable program code embodied therewith, the computer usable program code comprising:
computer usable program code for storing staleness criteria for contacts in a list of contacts, wherein the staleness criteria are adjustable by an end user;
computer usable program code for applying the stored staleness criteria to a selected contact to identify a stale contact; and,
computer usable program code for prompting the end user to select a desired action from a list of different desired actions with regard to the identified stale contact by displaying a dialog box to the end user and requiring the end user to select the desired action from the list of different desired actions performed upon the identification of the stale contact, the list of different desired actions comprising any combination of removing the identified stale contact from the list of contacts, grouping the identified stale contact with other identified stale contacts in the list of contacts, denoting the identified stale contact as stale in the list of contacts, notifying the end user of the identified stale contact, notifying an owner of the list of contacts of the identified stale contact, initiating a phone call between the end user and the identified stale contact, and scheduling a meeting between the end user and the identified stale contact.

12. The computer program product of claim 11, wherein the computer usable program code for storing staleness criteria for contacts in a list of contacts comprises computer usable program code for storing a minimum frequency of communicative interaction with each contact over a threshold period of time.

13. The computer program product of claim 11, wherein the computer usable program code for storing staleness criteria for contacts in a list of contacts comprises computer usable program code for storing a minimum quality of communicative interaction with each contact over a threshold period of time.

14. The computer program product of claim 11, wherein the computer usable program code for storing staleness criteria for contacts in a list of contacts comprises computer usable program code for establishing a required on-going collaborative membership in a collaborative tool with each contact over a threshold period of time.

15. The computer program product of claim 11, further comprising computer usable program code for storing different staleness criteria for different roles of the contacts in the list of contacts.

* * * * *